Patented July 15, 1952

2,603,650

UNITED STATES PATENT OFFICE 2,603,650

PREPARATION OF HETEROCYCLIC COMPOUNDS

Louis Schmerling, Riverside, Ill., assignor to Universal Oil Products Company, Chicago, Ill., a corporation of Delaware No Drawing. Application July 25, 1947, Serial No. 763,735

16 Claims. (Cl. 260—327)

This application is a continuation in part of my copending application Serial No. 741,945 filed April 16, 1947, now abandoned.

This invention relates to a process for preparing a particular type of heterocyclic compounds containing a non-metal of group VI of the periodic table and, particularly, to the preparation of heterocyclic compounds containing oxygen and sulfur.

An object of this invention is the production of a heterocyclic compound containing a non-metal of group VI of the periodic table and in which one of the carbon atoms of the heterocyclic ring is a quaternary carbon atom.

Another object of this invention is the production of a heterocyclic compound containing oxygen and in which one of the carbon atoms of the heterocyclic ring is a quaternary carbon atom.

Still another object of this invention is the production of a heterocyclic compound containing sulfur and in which one of the carbon atoms of the heterocyclic ring is a quaternary carbon atom.

A further object of this invention is the production of a 4,4-dialkyltetrahydropyran.

A still further object of this invention is the production of a 4,4-dialkyltetrahydrothiopyran.

One specific embodiment of this invention relates to a process for preparing a heterocyclic compound containing a quaternary carbon atom which comprises reacting an olefin and a saturated dihalogenated hydrocarbon which may be represented by the formula:

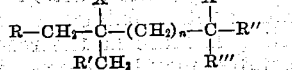

in which R, R', R", and R'" each represents a member of the group consisting of hydrogen, an alkyl radical, and a cycloalkyl radical, X represents a halogen, and n is a character of the group consisting of 0, 1, and 2, in the presence of a Friedel-Crafts catalyst to form a dihalogenated saturated hydrocarbon containing a quaternary carbon atom, recovering the dihalogenated saturated hydrocarbon from the reaction mixture, reacting said dihalogenated saturated hydrocarbon with a binary compound of a metal selected from the members of the group consisting of the alkali and alkaline earth metals and a non-metal of group VI of the periodic table to form a heterocyclic compound containing said non-metal and having a quaternary carbon atom, and recovering said heterocyclic compound.

Another embodiment of this invention relates to a process for preparing a heterocyclic compound containing a quaternary carbon atom which comprises reacting a mono-olefin and a saturated dichloroalkane which may be represented by the formula:

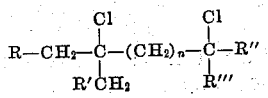

in which R, R', R" and R'" each represents a member of the group consisting of hydrogen, an alkyl radical, and a cycloalkyl radical, and n is a character of the group consisting of 0, 1, and 2 in the presence of a Friedel-Crafts catalyst to form a dichloroalkane containing a quaternary carbon atom, recovering the last-named dichloroalkane and reacting it with a binary compound of an alkali metal and of a non-metal of group VI of the periodic table to form a heterocyclic compound containing said non-metal and having a quaternary carbon atom, and recovering said heterocyclic compound.

According to this process, a heterocyclic compound containing a quaternary carbon atom is prepared by condensing a mono-olefin and a dihaloalkane, which may be represented by the formula:

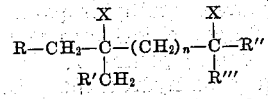

in which R, R', R", and R'" each represents a member of the group consisting of hydrogen, an alkyl radical, and a cycloalkyl radical, X represents a halogen (preferably a middle halogen, that is, chlorine or bromine), and n is a character of the group consisting of 0, 1, and 2, to form a higher molecular weight dihaloalkane containing a quaternary carbon atom, and said dihaloalkane is then heated with an oxide, sulfide, selenide, or telluride of a metal and preferably of an alkali metal or alkaline earth metal, and usually in the presence of water, to produce the desired heterocyclic compound. These oxides, sulfides, selenides, and tellurides are binary compounds of metals and non-metals of group VI of the periodic table.

In the first step of this process, saturated dihalogenated hydrocarbons are formed by reacting an olefin with a saturated dihalogenated hydrocarbon, that is, a dihaloalkane or dihalocycloalkane, in which at least one of the halogen atoms is attached to a tertiary carbon atom. The preferred halogens are chlorine and bromine which are sometimes referred to as the middle halogens. These dihalogenated hydrocarbon starting materials for this process may be represented by the following formula:

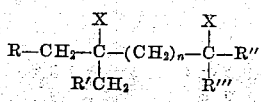

in which R, R', R'' and R''' each represents a member of the group consisting of hydrogen, an alkyl radical, and a cycloalkyl radical, X represents a halogen (preferably chlorine or bromine), and $n$ is a character of the group consisting of 0, 1, and 2. Also in some modifications of this invention, two of the R groups may be combined to form a cycloalkane ring.

The character $n$ shown in the preceding formulae and also shown hereinafter in the equations illustrating the type of heterocyclic compounds formed by this process has a value selected from the members of the group consisting of 0, 1, and 2. When $n$ is zero, the group enclosed by the parentheses, that is $(CH_2)$, is absent. When $n$ is 1, the symbol $(CH_2)_n$ represents a

group; and when $n$ is 2, the symbol $(CH_2)_n$ represents the group

The dihalogenated saturated hydrocarbon and olefin are combined in the presence of a Friedel-Crafts catalyst, including boron fluoride, to form a higher boiling dihalogenated hydrocarbon with a molecular weight equal to the sum of the molecular weights of the reactants. The best yields of condensation products are usually obtained when using as starting material a dihalogenated saturated hydrocarbon in which the halogens are combined with one tertiary and one non-tertiary carbon atom. These dihalogenated saturated hydrocarbons include isoprene dihydrochloride (more exactly referred to as 1,3-dichloro-3-methylbutane), isoprene dihydrobromide, 1,2-dichloro-2-methylpropane and 2-methylpentadiene dihydrochloride (also referred to as 2,4-dichloro-2-methylpentane). Typical saturated dihalogenated hydrocarbons in which both halogen atoms are attached to tertiary carbon atoms are 2,5-dichloro-2,5-dimethylhexane, limonene dihydrochloride (that is, 1-chloro-4-(1-chloro-isopropyl)-1-methylcyclohexane) and 2,3-dibromo-2,3-dimethylbutane. Some of these dihalides are crystalline compounds which are preferably dissolved in an inert solvent such as pentane before being subjected to the condensation reaction with an olefin.

Olefinic hydrocarbons utilizable in this process include ethylene, propylene, the butylenes, the pentenes, hexenes, and higher boiling normally liquid alkenes as well as various cyclic olefins including cyclopentene and cyclohexene hydrocarbons. Ethylene is the olefin preferred for condensation with dihalogenated hydrocarbons as the resultant higher molecular weight polyhalo saturated hydrocarbon contains at least one primary halogen atom, that is, the halogen is bound to a carbon atom at the end of the carbon chain, said carbon atom being also combined with two hydrogen atoms.

Catalysts suitable for use in the process of this invention range from such active catalysts as aluminum chloride and aluminum bromide to catalysts of intermediate activities as ferric chloride and boron fluoride and such catalysts of mild activities as bismuth chloride, zinc chloride, titanium tetrachloride and the like. Molecular complexes of these Friedel-Crafts halide catalysts with oxygen-containing compounds such as the alcoholates, etherates, ketonates, and complexes with nitroparaffins may also be used. The catalyst sludges formed in this process contain a Friedel-Crafts catalyst and may also be recycled and utilized for condensing dihaloalkanes and olefinic hydrocarbons as herein set forth when employing Friedel-Crafts catalysts.

The reaction temperature used in the process will depend upon the particular reactants and also upon the catalyst employed. While the process is generally carried out at a temperature of from about $-40°$ C. to about $100°$ C., a temperature of from about $-40°$ to about $+50°$ C. is preferred when using catalysts comprising aluminum chloride, aluminum bromide, ferric chloride, and boron fluoride, while temperatures of from about $0°$ to about $100°$ C. are used with most of the other metal halide catalysts such as bismuth chloride, zinc chloride, titanium chloride, etc.

This process may be carried out using either batch or continuous types of operation. In batch-type treatment the dihalogenated saturated hydrocarbon and an olefin are reacted in the presence of one or more of the above indicated halide catalysts in a closed reactor provided with adequate means of agitation and maintained at a temperature at which the condensation reaction is effected. The resultant reaction mixture is then subjected to suitable separating treatment to recover unconverted reactants which are suitable for further treatment in the process and to isolate the desired dihalogenated condensation product which is then reacted with an oxide, sulfide, selenide, or telluride of a metal and preferably of an alkali metal or alkaline earth metal to form a heterocyclic compound.

Continuous operation may be carried out by charging the olefinic compound and dihalogenated saturated hydrocarbon to a reactor containing a Friedel-Crafts metal halide catalyst, particularly, aluminum chloride, distributed upon or composited with a supporting material such as silica, alumina, charcoal, or another carrier and provided with suitable heating or cooling means for controlling the reaction temperature. When operating with a catalyst which is soluble in the reaction mixture at the reaction conditions, the catalyst may be charged continuously to the reactor to which the dihalogenated saturated hydrocarbon and olefin are charged. Or, the catalyst may be dissolved in a suitable solvent such as a nitroparaffin and charged continuously together with the mixture of reactants. From the exit end of the reactor or series of reactors, in case more than one reactor is used, the reaction mixture is directed to suitable separating and/or fractional distilling means by which the dihalogenated saturated hydrocarbon formed in the process may be separated from the unconverted starting material and catalyst, these unconverted materials and catalyst being suitable for recycling to the process.

Condensation of ethylene and a saturated dihalogenated hydrocarbon in which one of the halogen atoms is combined with a tertiary carbon atom in the presence of aluminum chloride gives an excellent yield of a dihalogenated saturated hydrocarbon containing a quaternary carbon atom and in which at least one of the halogen atoms is attached to a primary carbon atom as indicated in the equations:

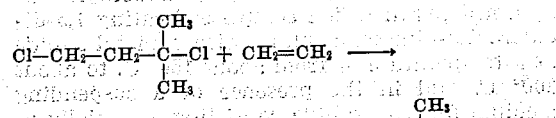

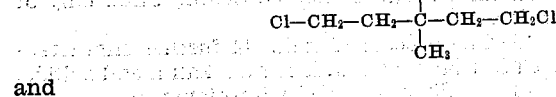

and

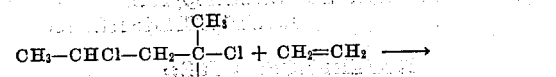

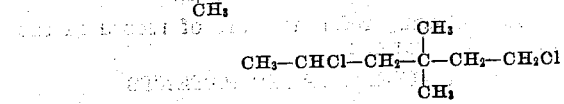

Dihalogenated saturated hydrocarbons of the type formed as herein set forth are useful intermediates for organic syntheses since they offer a convenient means for preparing many compounds, including heterocyclic compounds. For example, 1,5-dihalo-3,3-dimethylpentane which is formed by condensing ethylene with isoprene dihydrohalide is a suitable intermediate for preparing heterocyclic compounds containing six atoms in a ring, five of which are carbon atoms. For example, 1,5-dichloro-3,3-dimethylpentane reacts with water and alkali or alkaline earth metal oxides, sulfides, selenides, and tellurides to form 4,4-dimethyltetrahydropyran, 4,4-dimethyltetrahydrothiopyran, 4,4-dimethyltetrahydroselenopyran, and 4,4-dimethyltetrahydrotelluropyran, respectively.

The reactions which may thus be employed in producing heterocyclic compounds by this process may be represented by the following equations:

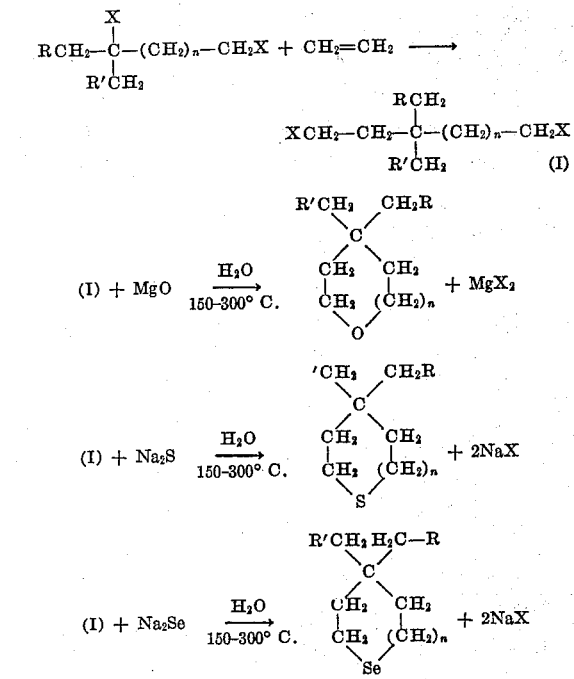

In these equations, R and R' are selected from the group consisting of hydrogen and alkyl and cycloalkyl radicals, X is a halogen (preferably chlorine or bromine) and $n$ is a character of the group consisting of 0, 1, and 2. Such heterocyclic compounds may be represented by the formula:

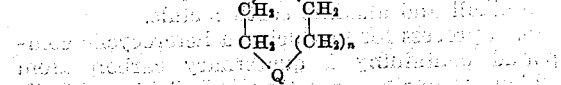

in which R and R' are selected from the group consisting of hydrogen, an alkyl radical, and a cycloalkyl radical, Q represents a non-metal of group VI of the periodic table, and $n$ is a character of the group consisting of 0, 1, and 2.

Similarly, the reaction of a dihalide containing halogen attached to a tertiary and to a secondary carbon atom may be illustrated by the following example:

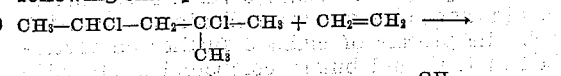

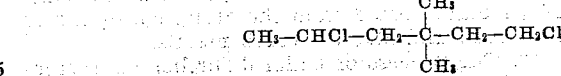

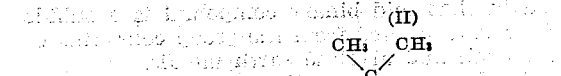

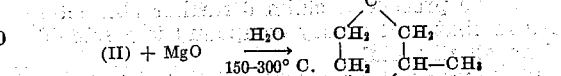

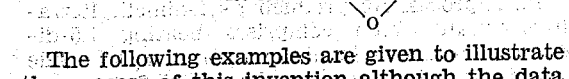

The following examples are given to illustrate the process of this invention although the data are not introduced with the intention of limiting unduly the broad scope of the invention.

Example I 1,5-dichloro-3,3-dimethylpentane was prepared in about 80% of the theoretical yield by the condensation of ethylene with isoprene dihydrochloride (i. e., 1,3-dichloro-3-methylbutane) in the present of aluminum chloride at −20 to −10° C. When the resultant dichlorodimethylpentane was heated at 250° C. with a molecular excess of magnesium oxide suspended in ten times its weight of water, there was obtained an excellent yield of a new compound, 4,4-dimethyltetrahydropyran, B. P., 124 to 126° C., $n_D^{20}$ 1.4238.

Example II

When the dichlorodimethylpentane, prepared as described in Example I, was heated with an aqueous solution of sodium sulfide at 210° C., 4,4-dimethyltetrahydrothiopyran was obtained in excellent yield. It boiled at 58° C. at 13 mm. pressure (about 168° C. at atmospheric pressure) and had a refractive index $n_D^{20}$, of 1.4900.

I claim as my invention:

1. A process for producing a heterocyclic compound containing a quaternary carbon atom which comprises reacting a 1,5-dihalo-3,3-dialkylpentane with a binary compound of a metal and of a non-metal of group VI of the periodic table at a temperature of from about 150° C. to about 300° C. and in the presence of a suspending medium for said binary compound consisting essentially of water.

2. The process of claim 1 further characterized in that said metal is an alkali metal.

3. The process of claim 1 further characterized in that said metal is an alkaline earth metal.

4. The process of claim 1 further characterized in that said binary compound is an oxide of a metal selected from the group consisting of the alkali and alkaline earth metals.

5. The process of claim 1 further characterized in that said binary compound is a sulfide of a metal selected from the group consisting of the alkali and alkaline earth metals.

6. A process for producing a heterocyclic compound containing a quaternary carbon atom which comprises reacting 1,5-dichloro-3,3-dimethylpentane with a binary compound of a metal and of a non-metal of group VI of the periodic table at a temperature of from about 150° C. to about 300° C. and in the presence of a suspending medium for said binary compound consisting essentially of water.

7. The process of claim 6 further characterized in that said metal is an alkali metal.

8. The process of claim 6 further characterized in that said metal is an alkaline earth metal.

9. The process of claim 6 further characterized in that said binary compound is an oxide of a metal selected from the group consisting of the alkali and alkaline earth metals.

10. The process of claim 6 further characterized in that said binary compound is a sulfide of a metal selected from the group consisting of the alkali and alkaline earth metals.

11. The process of claim 6 further characterized in that said binary compound is a selenide of an alkali metal.

12. A process for producing 4,4-dimethyltetrahydropyran which comprises heating 1,5-dichloro-3,3-dimethylpentane with a metal oxide at a temperature of from about 150° C. to about 300° C. and in the presence of a suspending medium for said oxide consisting essentially of water.

13. The process of claim 12 further characterized in that said oxide is magnesium oxide.

14. A process for producing 4,4-dimethyltetrahydrothiopyran which comprises heating 1,5-dichloro-3,3-dimethylpentane with a metal sulfide at a temperature of from about 150° C. to about 300° C. and in the presence of a suspending medium for said sulfide consisting essentially of water.

15. The process of claim 14 further characterized in that said sulfide is an alkali metal sulfide.

16. 4,4-dimethyltetrahydrothiopyran.

LOUIS SCHMERLING.

REFERENCES CITED

The following references are of record in the file of this patent:

UNITED STATES PATENTS

| Number | Name | Date |
|---|---|---|
| 2,160,915 | Schreiber | June 6, 1939 |
| 2,242,575 | Eisleb | May 20, 1941 |
| 2,408,519 | Avison | Oct. 1, 1946 |
| 2,411,225 | Patterson | Nov. 19, 1946 |
| 2,419,500 | Peterson | Apr. 22, 1947 |

OTHER REFERENCES

Bouchardat: Comptes rendus, 89, 1118 (1879).
Beilsteins, Handbuch der Organischen Chemie, ed. 4, vol. 17, p. 15, Springer, Germany.
Braun: Ber. 43, 545–551 (1910).
Grishkevich-Trokhimovskii: Chem. Abst. 11, 786 (1917).